March 29, 1927.
R. SCHLATTER
1,622,398
INTERNAL COMBUSTION ENGINE
Filed Aug. 22, 1924
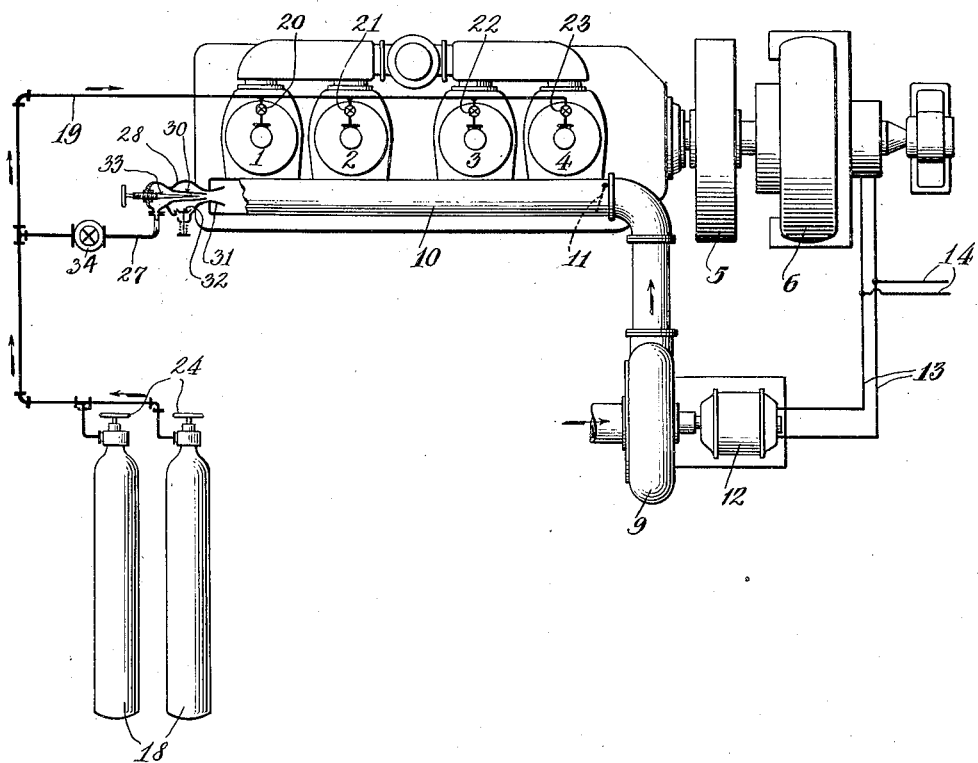
INVENTOR
Rudolph Schlatter
ATTORNEYS.

Patented Mar. 29, 1927.

1,622,398

UNITED STATES PATENT OFFICE.

RUDOLPH SCHLATTER, OF ST. LOUIS, MISSOURI, ASSIGNOR TO BUSCH-SULZER BROS.-DIESEL ENGINE CO., OF ST. LOUIS, MISSOURI, A CORPORATION OF MISSOURI.

INTERNAL-COMBUSTION ENGINE.

Application filed August 22, 1924. Serial No. 733,470.

This invention is a starting means for two-cycle engines and more particularly engines wherein the normal supply of scavenging air is derived from a pump or blower which is not directly driven by the engine and may not therefore be available for the delivery of an adequate air supply when the engine is being started or is not up to normal speed. Such conditions are apt to occur, for example, in marine power plants when the scavenger blower is electrically driven by a generator direct connected to the engine and no battery or outside source of current is available for driving it. Such a condition is also apt to occur in any two-cycle power plant in the event of an accident to the normal air supply system. To such extent the present invention may constitute an emergency or stand-by supply system for scavenging air.

This invention consists in the addition to such a two-cycle power plant, of a scavenging air compressor operated by air taken from bottles or tanks previously charged to high pressures. The particular field of use for the invention is in connection with engines in which air is stored, either for the purpose of starting them or for maneuvering, as in marine plants, or for the purpose of injecting and atomizing the fuel, as in Diesel engines, and in this connection the invention contemplates the use of such usual starting or injection air as the source of energy for producing the scavenging air supply during starting and in emergencies.

The single figure of the accompanying drawing diagrammatically illustrates my invention applied to a four-cylinder two-cycle Diesel or fuel injection engine.

The engine is shown in plan in the drawings, and many of the usual parts not essential to the invention have been omitted from the drawings. The four cylinders are indicated at 1, 2, 3 and 4. The fly-wheel 5 and electric generator 6 are conducted directly to the engine shaft. Under normal conditions the pump or blower 9 furnishes the scavenging air to the scavenging air receiver or manifold 10 at the usual relatively low pressure. At 11 a check valve is shown diagrammatically; this closes toward the blower and may be automatically opened by the air flow from the blower. The electric driving motor for the scavenging air blower is marked 12. Through the conductors 13 the generator 6 supplies the current which drives the blower motor 12 during the normal operation of the engine; through the conductors 14 is supplies such other loads as the generator is intended to carry. As usual in engines of this class, air for starting and maneuvering the engine is previously compressed to high pressure by means driven by the engine but not shown in the drawings, and is stored in the reservoir or bottles 18 from which a pipe 19 leads to the starting valves of the individual cylinders. These valves are marked 20, 21, 22 and 23 and are so organized that the starting air can be supplied to or excluded from the various cylinders as will be understood by those skilled in this art. The air reservoirs 18 are also provided with individual reservoir valves marked 24. It is assumed, as is often the case, that there is no source of electrical energy for driving the blower motor 12 except the generator 6, and it will be noted, that the generator voltage is a function of the engine and generator speed and is designed to be appropriate to operate the motor under the normal or full speed conditions. Accordingly the generator voltage does not reach a value high enough to start the blower motor until the engine reaches substantially its operating speed; that is to say, the blower 9 is unable to furnish scavenging air while the engine is being started.

For the purpose of producing an adequate supply of scavenging air during the starting period, and while the engine is turning over at such sub-normal speeds that the generator voltage is too low to operate the blower motor, energy is taken from the highly compressed starting air in the bottles 18 as before stated. For this purpose, in the present instance, a branch pipe 27 leads this high pressure air from the storage bottles 18 to the nozzle 30 of an air injector 28 opening into the scavenging air tunnel 10. The injector is shown in section. The high pressure jet from the injector nozzle 30 coacts, as usual, with the contracted throat 31 of the injector to draw in air from atmosphere through the check valve 32 and deliver it into the scavenging air tunnel under an appropriate pressure. The needle valve 33 serves to regulate the high pressure jet and thereby controls the scavenging air supply. The shut-off valve 34 in the air line 27 is available for stopping and starting the injector action without interfering with the flow of air to the starting valves or the fuel injection valves.

The operation is as follows: The engine is set in motion, for example by opening all the valves 20, 21, 22, 23 and 24. This admits the high pressure starting air to all the cylinders under the control of the customary engine-operated starting valves (not shown). The valve 34 is opened to start the injector in action and the high velocity air jet then induces an air flow from the atmosphere through the valve 32 and delivers it into the air tunnel 10 at a pressure suitable for scavenging purposes as before stated. At this time the check valve 11 is closed, for example by reason of the fact that the pressure in the scavenging tunnel is greater than the substantially atmospheric pressure in the delivery pipe of the inactive blower 9. Escape of air backwards through the blower is thus prevented. Until the engine is regularly firing the blower does little or no work, since the engine speed is not sufficient to cause the generator to impress sufficient voltage on the blower motor to start it. When some or all of the engine cylinders begin firing, however, and the engine approaches its operating speed, the blower begins to work. The check valve 11 is then opened and the blower supplies the scavenging air in the usual way, and the injector may be shut off. Subsequent escape of the air through the injector is prevented by the check valve 32. A relatively small amount of high pressure air is thus utilized to do the work of the normal air blower during the period of its incapacity.

It will now be apparent that while the invention has special utility in the case of Diesel or other engines using air for fuel injection, it is also useful in any two-cycle engine power plant.

I claim:

1. The combination with a two-cycle internal combustion engine, of a normal source of scavenging air, means for setting the engine in motion, a source of high pressure fluid, and means operated thereby for supplying scavenging air during the engine starting period.

2. The combination with an internal combustion engine and its high pressure starting air or maneuvering tank, of means operated by air derived from said tank for compressing air and supplying the same to the engine for scavenging.

3. In an internal combustion engine, the combination with its high pressure starting air or maneuvering tank, and its means for normally furnishing scavenging air, of an injector for compressing air from the atmosphere for engine scavenging, a connection leading air from said high pressure tank to said injector for operating the same, and means for stopping the flow of air from said tank to the injector when said normal means for furnishing scavenging air is functioning.

4. The combination with an internal combustion engine, its high pressure starting air tank, and means for normally furnishing scavenging air for said engine, of an injector for compressing air from the atmosphere in the scavenging air receiver of the engine, a connection for operating said injector from said tank, and means for shutting off backward air flow through said normal scavenging air means when the injector is functioning and for shutting off backward flow through the injector when said normal means is functioning.

In testimony whereof, I have signed this specification.

RUDOLPH SCHLATTER.